Figure 1:
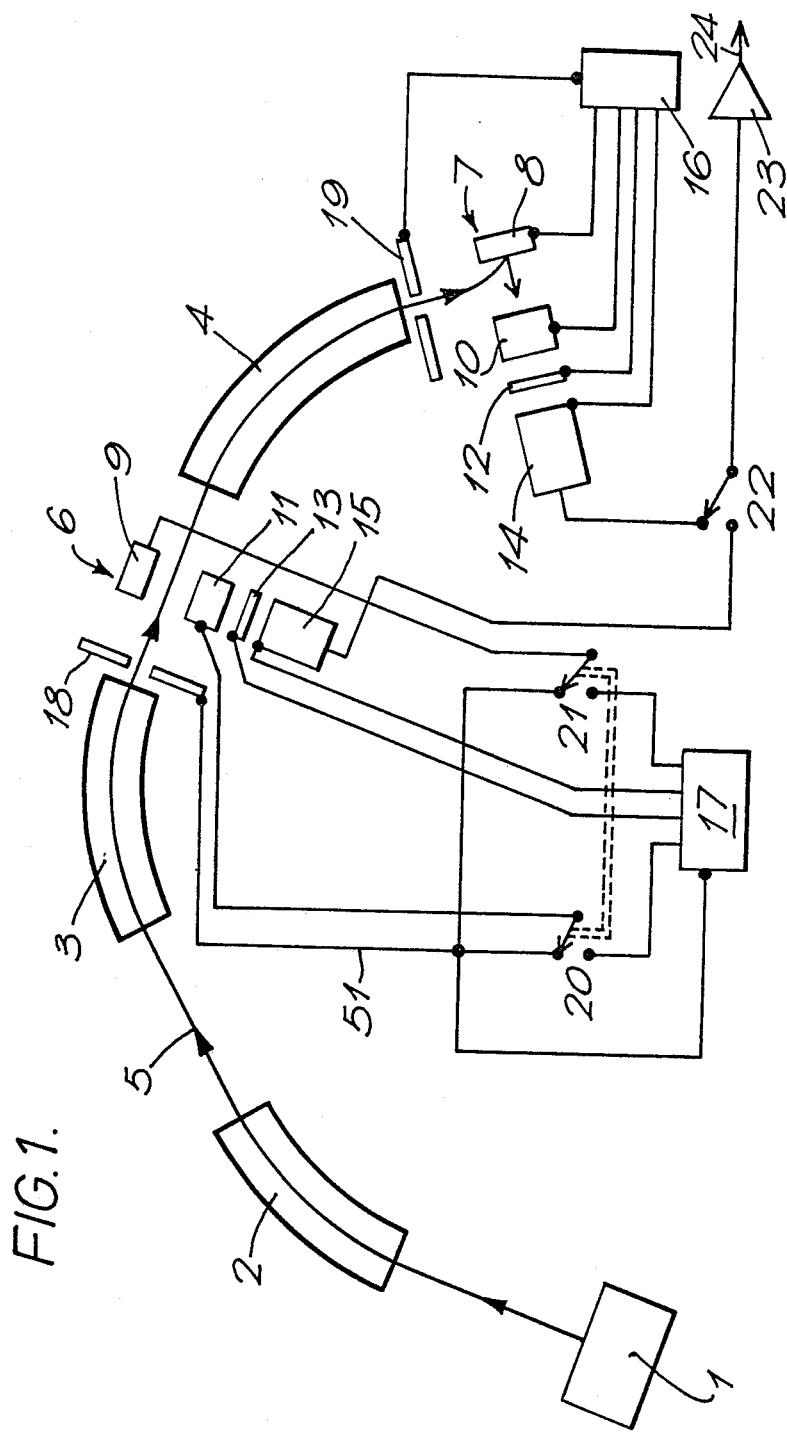

United States Patent [19]

Bateman

[11] Patent Number: 4,810,882

[45] Date of Patent: Mar. 7, 1989

[54] MASS SPECTROMETER FOR POSITIVE AND NEGATIVE IONS

[75] Inventor: Robert H. Bateman, Knutsford, England

[73] Assignee: VG Instruments Group Limited, Crawley, England

[21] Appl. No.: 164,258

[22] Filed: Mar. 4, 1988

[30] Foreign Application Priority Data

Mar. 6, 1987 [GB] United Kingdom ............... 8705289

[51] Int. Cl.[4] .............................................. H01J 49/06
[52] U.S. Cl. .................................... 250/281; 250/283; 250/299; 250/397
[58] Field of Search ............... 250/281, 283, 299, 397

[56] References Cited

U.S. PATENT DOCUMENTS

| | | | |
|---|---|---|---|
| 3,898,456 | 8/1975 | Dietz | 250/299 |
| 4,136,280 | 1/1979 | Hunt et al. | 250/292 |
| 4,267,448 | 5/1981 | Feser et al. | 250/281 |
| 4,423,324 | 12/1983 | Stafford | 250/281 |

Primary Examiner—Bruce C. Anderson
Assistant Examiner—Jack I. Berman
Attorney, Agent, or Firm—Chilton, Alix & Van Kirk

[57] ABSTRACT

The invention provides a mass spectrometer capable of detecting both positive and negative ions. Positive ions emerging from the mass analyzer strike a conversion electrode to release secondary electrons which pass through an annular electrode to strike a phosphor, releasing photons. Negative ions strike the surface of the annular electrode to release secondary electrons which also strike the phosphor, releasing photons. The photons are detected with a conventional photomultiplier. The electrodes are biased and disposed so that both positive ions and negative ions may be detected without changing the potentials applied to them.

15 Claims, 2 Drawing Sheets

MASS SPECTROMETER FOR POSITIVE AND NEGATIVE IONS

This invention relates to mass spectrometers adapted for operation with both positive and negative ions, and in particular with high mass ions of both polarities.

Mass spectrometers adapted for the analysis of both positive and negative ions clearly require an ion detector capable of detecting ions of both polarities. Positive ion detectors suitable for this purpose are well known in the art. They typically comprise an electron multiplier disposed to receive ions from the mass analyzer of the spectrometer on its first dynode, which is maintained at a potential of approximately −3 kV. Positive ions emerging from the analyzer with a translational energy of between +10 eV and +8 keV (dependent on the type of analyzer) and substantially at earth potential are further accelerated by the electrical field between the exit of the mass analyzer and the first dynode so that the ions strike the dynode with sufficient velocity to release secondary electrons.

It is also known to provide a separate conversion dynode which is disposed in the path of the ions to be detected. Secondary electrons emitted from this dynode are accelerated into an electron multiplier disposed so that ions, photons and neutral particles emerging from the analyzer cannot strike its first dynode. In this way the background ion current of the mass spectrometer can be reduced.

As an alternative to the use of an electron multiplier mounted inside the vacuum envelope of the spectrometer, a scintillator may be provided in the place of the first dynode of the electron multiplier. A sealed photomultiplier is used to detect the photons emitted by the scintillator, as explained by Richards and Hays in Review of Scientific Instruments, 1950 vol. 21 pp 99–101. In order to avoid damage to the scintillator through bombardment by heavy ions, it is preferable to incorporate a separate conversion dynode, as in the detectors described by Schotze and Bernhard, (Zeit. für Phys, 1956, vol. 145 pp 44–47), and Daly (Rev. Scientific Instrum, 1960 vol 31(3) pp 264–7).

The construction of an efficient detector for negative ions presents greater problems. In order to cause incident negative ions to strike the first dynode of an electron multiplier with sufficient velocity, the dynode must be maintained at a potential of at least 3 kV, assuming that the ions are at earth potential and have only a small translational energy. Consequently, its output electrode will be at an even higher positive potential with respect to earth, which greatly complicates the design of the signal amplifier. The use of a scintillator type detector, which provides electrical isolation between the conversion dynode and the output of the photomultiplier, overcomes this difficulty, but such detectors are usually insensitive because secondary electrons are inhibited from leaving the region of the conversion dynode which is of necessity maintained at a high positive potential. It is very difficult to devise an arrangement of electrodes which provides an extraction field for the secondary electrons but which does not cause the incident negative ions to be deflected away from the conversion dynode. Dietz, in U.S. Pat. No. 3,898,456, suggests that a high sensitivity detector for both positive and negative ions can be made by including an electron multiplier between the conversion dynode and the scintillator, but this detector is obviously expensive to construct.

Another method of detecting negative ions which does not involve the emission of secondary electrons from the positively charged conversion dynode or the use of a scintillator is to accelerate the negative ions onto a conversion dynode in the conventional way but to detect the positive ions and neutral fragments which are emitted on impact of the negative ions on the dynode surface. Preferably these are detected by an electron multiplier, the first dynode of which is maintained more negative than the conversion dynode to attract positive ions. In this way the output of the detector can be close to earth potential and the difficulty of extracting secondary electrons from the positive conversion dynode is avoided. Detectors based on this principle are described in U.S. Pat. Nos. 4,267,448 and 4,423,324. Especially with high mass negative ions, however, the process is rarely more than 30% efficient, and it has been found that efficiency is also dependent on the nature and mass of the incident ions, which limits the applicability of the detector in a high performance mass spectrometer.

Experiments carried out by Beuhler, R. J, and Friedman, L, described in Nuclear Instruments and Methods, 1980, vol. 170 pp 309–315, suggest that a minimum velocity of approximately 18,000 m.s. is required to ensure secondary electron emission when an ion strikes a conversion dynode. Consequently, when high mass ions are to be efficiently detected it is necessary to accelerate the ion through a potential gradient of at least 10 kV before it strikes the conversion dynode. This is done in several of the known negative ion detectors, but it will be appreciated that if a dual polarity ion detector which uses the same conversion dynode for positive and negative ion detection is constructed, it is necessary to switch the potential on the dynode between very high positive and negative potentials to change from the detection of negative ions to the detection of positive ions. This results in the need for complicated electronic circuitry, and in any case cannot be done very quickly because of limitations in the currently available electronic technology. I dual polarity detectors incorporating a scintillator, it is also necessary to switch the polarity of the potential applied to the front face of the scintillator and in the detector described by Dietz, no less than four potentials must be switched.

An alternative form of dual polarity ion detector which does not require the switching of high potentials uses separate conversion dynodes for positive and negative ions. This requires some means for directing positive ions to one dynode and negative ions to the other, and it is difficult to do this without the provision of deflecting electrodes which require polarity switching. Thus in one prior detector of this kind, described in U.K. Pat. No. 1,567,490, the ion beam is simply divided into two portions by means of a plate containing two apertures, both off-axis with respect to the incident beam. An electron multiplier is positioned behind each aperture, one biased to detect positive ions, and the other biased to detect negative ions. This second multiplier of necessity must have its output several kV above earth potential, as explained. The division of the ion beam is clearly inefficient as many ions will not enter either aperture, despite the field penetration from the multiplier entrances. An improved version of a dual polarity detector is described in U.S. Pat. No. 4,423,324, in which a similar plate is used to divide the ion beam, but separate conversion dynodes and a single electron multiplier are used. This detector relies on the conversion of incident negative ions to positive ions, which process is of relatively low and variable efficiency.

Consequently, known mass spectrometers capable of operating with both positive and negative ions incorporate ion detectors which either require complex and relatively slow electronic circuitry for switching one or more very high potentials, or comprise an inefficient means of dividing the ion beam into two separated beams comprising positive and negative ions, respectively, with a consequent loss in sensitivity. Further, in the latter case, either two electron multipliers must be provided, one having an output potential several kV above earth, or reliance must be placed on the use of the imperfectly understood ion conversion process, the efficiency of which is both low and variable, for the detection of negative ions.

It is the object of the present invention to provide a mass spectrometer capable of operating with high efficiency with both positive and negative ions, and which does not require the switching of very high potentials applied to its ion detector.

According to one aspect, the invention comprises a mass spectrometer having a mass analyzer and means for the detection of both positive and negative ions leaving said mass analyzer, said spectrometer comprising:

(a) conversion electrode means so disposed and maintained at such a potential that said positive ions strike its surface and release first secondary electrons therefrom;

(b) transmission/conversion electrode means so disposed and maintained at such a potential that said first secondary electrons are transmitted thereby and said negative ions strike its surface to release second secondary electrons therefrom;

(c) photoemissive means so disposed and maintained at such a potential that said first and said second secondary electrons strike its surface to release photons therefrom; and (d) photosensitive means disposed to receive said photons to produce an electrical signal indicative of their number.

According to another aspect, the invention comprises a mass spectrometer having a mass analyzer with an exit aperture through which a beam of ions emerges along an axis, said spectrometer comprising, at a location beyond said exit aperture, (a) conversion electrode means maintained at a negative potential with respect to said exit aperture and displaced from said axis;

(b) transmission/conversion electrode means maintained at a positive potential with respect to said exit aperture and disposed substantially opposite to said conversion electrode means on the other side of said axis;

(c) photoemissive means, capable of emitting photons when bombarded with electrons, maintained at a positive potential with respect to said transmission/conversion electrode means and disposed on the opposite side of said transmission/conversion electrode means to said axis; and (d) photosensitive means disposed to receive photons emitted by said photoemissive means to produce an electrical signal indicative of their number.

Thus, in a preferred embodiment, the spectrometer of the invention comprises an ion detector with a conversion electrode situated off-axis from the ion beam emerging from its mass analyzer so that in the absence of any potential difference between the electrode and the exit aperture of the analyzer, the ion beam would not intercept the surface of the electrode. Typically the conversion electrode comprises a flat plate disposed parallel to the direction of the emerging beam.

A transmission/conversion electrode is disposed on the other side of the beam, opposite to the conversion electrode and so that in the absence of any potential applied to it, the beam does not strike it. Typically this electrode is a hollow cylinder with its axis transverse to the beam axis. At the end of the transmission/conversion electrode remote from the beam axis a photoemissive means is provided with its front face metalized to allow it to be maintained at a fixed potential. Preferably the photoemissive means comprises a phosphor coated on a transparent support which emits photons when bombarded with electrons. By the term phosphor it is meant any material which emits photons when bombarded by electrons. For example, the term is meant to include materials known as scintillators. Photosensitive detection means, preferably a photomultiplier or a photodiode, are provided beyond the phosphor to receive the light emitted. Preferably the photomultiplier is arranged with its output substantially at ground potential.

In operation, a high negative potential (typically −15 kV) is applied to the conversion electrode, and a potential of approximately +5 kV to the transmission/conversion electrode. Both potentials are measured relative to the potential of the exit aperture of the mass analyzer preceding the electrodes, which is usually earth potential. A high positive potential, typically +15 kV relative to the exit aperture, is also applied to the phosphor. Positive ions in the beam emerging from the exit aperture are deflected from their original direction of travel by the electrical field created by the conversion electrode, and collide with it at a velocity sufficient to release secondary electrons. These are subsequently accelerated through the transmission/conversion electrode (+7.5 kV) to the phosphor (+15 kV) which they impact with sufficient velocity to release photons. These photons pass through the transparent phosphor support element and are detected by the photosensitive means. Thus the transmission/conversion electrode, maintained at a potential intermediate between those of the conversion electrode and the phosphor, may act as an element of an electrostatic lens which causes the electrons to converge on the phosphor, thereby increasing the efficiency of the detector system. This is done by selecting the potential on the transmission/conversion electrode, which must however lie between a lower limit which is more positive than the exit aperture of the mass analyzer and an upper limit which is more negative than the potential of the phosphor. Preferably the difference between the transmission/conversion electrode potential and the aperture and phosphor potentials should be at least several kV in both cases. The shape and position of the transmission/conversion electrode may also be selected to optimize the transmission of secondary electrons, within the limits imposed by the requirements of negative ion detection, discussed below.

Negative ions in the beam emerging from the mass analyzer are deflected from their original direction of travel and towards the positively charged transmission/conversion electrode, assisted by the field due to the negatively charged conversion electrode. The negative ions strike the inner surface of the transmission/- conversion electrode at an acute angle and with sufficient energy to release secondary electrons. The majority of these will leave in a direction approximately perpendicular to the direction of the incoming beam of negative ions in the region of the surface. Thus the secondary electrons leave the surface of the transmission/conversion electrode in the direction of the phosphor, and are soon influenced by the electrostatic field due to the higher positive charge on the phosphor. They are consequently accelerated out of the transmission/conversion electrode and impact the phosphor with sufficient energy to release photons.

In this way the invention provides a mass spectrometer which is capable of detecting both positive and negative ions without the need for switching high potentials. The efficiency of detection of negative ions is substantially independent of the nature and mass of the negative ions because it does not rely on the conversion of negative ions to positive ions, but rather on the release of secondary electrons by the incident negative ions. The detection efficiency of the negative ions is higher than that obtained with some prior types of negative ion detectors which do rely on the release of secondary electrons because of the efficient extraction of the secondary electrons from the transmission/conversion electrode.

Preferably the photoemissive means comprises a phosphor with a short delay time. The phosphor is coated on a glass or quartz support disposed between the transmission/conversion electrode and the photosensitive means (which typically comprises a photodiode or a photomultiplier). A yttrium silicate P47 phosphor is particularly suitable, having a delay time sufficiently short (80 nS for the light output to fall to 10% of its peak value) to ensure no significant loss of resolution in a fast scanning high resolution organic mass spectrometer.

The surface of the phosphor is preferably aluminized both to protect it and to allow its surface to be maintained at a constant electrical potential. A suitable aluminium coating may contain 7.5 mg of aluminium/sq.cm. The coating also serves to reflect photons generated in the phosphor through the transparent support towards the photodiode or photomultiplier, thereby increasing the efficiency of detection of the ions. The method of aluminizing phosphors is well known in the art. The presence of the aluminium coating does however reduce the energy of the incident electrons by approximately 2 keV, which means that the potential of the phosphor must be at least 2 kV more positive than the value required for the efficient release of photons by the uncoated phosphor.

It will be appreciated that because the ion beam to be detected does not intercept either of the electrodes if potentials are not applied to them, a mass spectrometer according to the invention may comprise ion detectors at positions other than after the final analyzing sector. For example, in a tandem mass spectrometer having at least two mass or energy analyzing stages an intermediate detector may be situated between two of the stages as well as after the final stage. When it is required to detect ions leaving an intermediate stage, the intermediate detector is enabled simply by applying the necessary potentials to its electrodes. When ions are required to enter the next stage, the intermediate detector is disabled by connecting its electrodes to the same potential as the exit aperture of the previous stage. Thus in another preferred embodiment, a mass spectrometer according to the invention may comprise a first mass analyzer, a first ion detector for detecting ions leaving the first mass analyzer, a second mass analyzer and a second ion detector for detecting ions leaving the second mass analyzer. In such an instrument the first ion detector may comprise conversion electrode means, transmission/conversion electrode means, photoemissive means and photosensitive means, and power supply means for supplying electrical potentials thereto such that the first ion detector can detect positive and negative ions or can allow these ions to pass substantially undeflected therethrough into the second mass analyzer.

Figure 2:
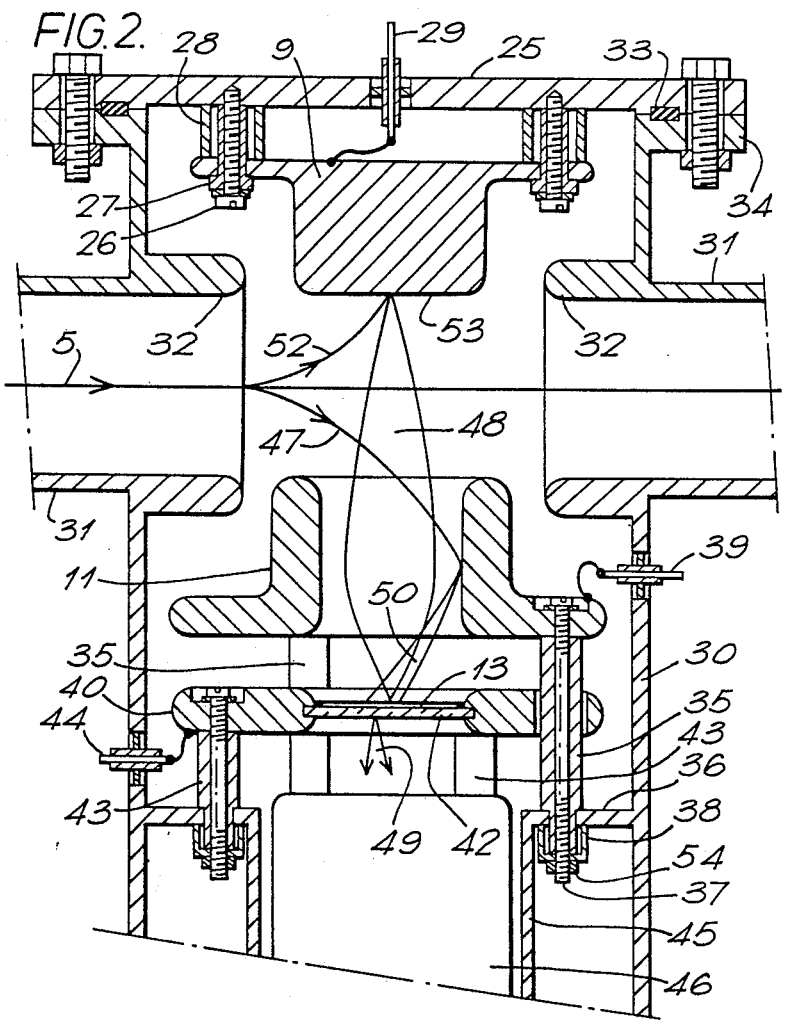
Figure 3:
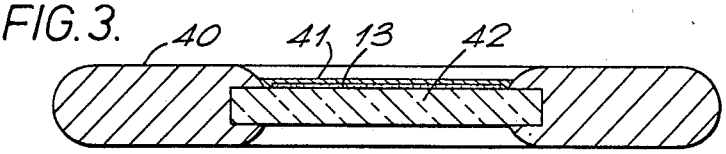

A preferred embodiment of the invention will now be described by way of example with reference to the figures, in which:

FIG. 1 is a schematic drawing of a tandem mass spectrometer according to the invention and having detectors in two locations, FIG. 2 is a drawing showing the construction of a detector used in the spectrometer of FIG. 1, and FIG. 3 is a drawing of a photosensitive means and its support element suitable for use in the detector of FIG. 2.

Referring first to FIG. 1, a tandem mass spectrometer suitable for operation with both positive and negative ions comprises an ion source 1 and three analyzing stages 2, 3 and 4 which may be mass or energy analyzers, through which at least some of the ions travel along trajectory 5. Exit apertures 18 and 19 are disposed after stages 3 and 4, respectively. Typically, stages 2 and 3 may be a magnetic and an electrostatic analyzer, respectively, together comprising a high resolution double focusing mass spectrometer, and stage 4 may be a further magnetic sector analyzer capable of mass analyzing daughter ions formed in a collision cell (not shown) located between stages 3 and 4. FIG. 1 is given by way of example only, however, and it will be appreciated that the invention is not limited to the type of spectrometer illustrated in that figure. Any type of spectrometer incorporating magnetic sector, electrostatic sector or quadrupole analyzing stages can be modified for the detection of positive and negative ions according to the invention.

In the spectrometer of FIG. 1, two ion detectors, generally indicated by 6 and 7, are provided, each comprising a conversion electrode (8, 9), a transmission/conversion electrode (10,11), a photoemissive means (12,13) in the form of a phosphor mounted on a support element, and a photosensitive means (14,15). The potentials required by these components are generated by power supplies 16 and 17.

In order to permit ions to pass into analyzer stage 4, detector 6 may be disabled by disconnecting the power supply 17 from electrodes 9 and 11 by operating switches 20 and 21. When the detector is disabled, these electrodes are connected to exit aperture 18, as shown, permitting the ions leaving stage 3 to enter stage 4. Usually, aperture 18 will be close to earth potential. Alternatively, switches 20 and 21 may be omitted, and detector 6 can be disabled by disconnecting the power supplied to power supply 17. The zero volt line of the power supply is maintained at the same potential as exit aperture 18 by lead 51, so that in the absence of any power input to supply 17, all the components of detector 6 will remain substantially at that potential.

The outputs of the photosensitive means 14 and 15 are selected by switch 22 (preferably ganged to switches 20 and 21), and the selected signal is amplified by amplifier 23 to give an output signal on lead 24. This signal is used to feed a computer-based data acquisition system as in the case of a mass spectrometer with a conventional ion detector.

Referring next to FIG. 2 which shows detector 6 in greater detail, conversion electrode 9 comprises a solid flanged cylinder supported from vacuum flange 25 by screws 26 and insulators 27 and 28 and providing at its end a flat plate 53 disposed parallel to the beam direction. Electrical connection to electrode 9 is made via vacuum tight feedthrough 29.

Flange 25 is sealed by gasket 33 to a mating flange 34 on one end of a cylindrical detector housing 30 which is disposed perpendicularly to the flight tube 31 through which ions travel a long trajectory 5. Flight tube 31 is welded to housing 30 in a vacuum tight manner and fitted with cylindrical guard electrodes 32, as shown in FIG. 2. In the embodiment shown, these electrodes form part of housing 30 and are maintained at the same potential as the exit aperture 18 (not shown in FIG. 2). In most cases this will be earth potential.

The transmission/conversion electrode 11 comprises a hollow flanged cylinder supported by three insulators 35 (two of which are shown in FIG. 2). Insulators 35 are disposed on a circle at 120° to one another. They are shouldered as shown and pass through support flange 36. Screws 37, insulating caps 38 and nuts 54 are used to secure electrode 11 and insulators 35 to flange 36. The required electrical potential is applied to electrode 11 through feedthrough 39 in the wall of housing 30.

Referring additionally to FIG. 3, photoemissive means in the form of a phosphor 13 is coated on a transparent glass (or quartz) support 42 which is in the form of a flat disc. Support 42 is located in a groove cut in a disc-shaped support electrode 40. Electrode 40 conveniently comprises two portions joined along a diameter and held together by screws, permitting it to be dismantled to allow support 42 to be inserted. As explained, phosphor 13 preferably comprises a P47 type yttrium silicate. An aluminium layer 41 is coated over the exposed surface of the phosphor, typically at the rate of 7.5 mg/sq.cm. This extends to contact electrode 40 to allow the surface layer of aluminium to be maintained at a fixed potential. The method of manufacture of an aluminized phosphor suitable for use in the invention is well known in the art.

As shown in FIG. 2, support electrode 40 is attached to flange 36 by insulators 43 disposed at 120° to each other and equidistantly placed between pairs of insulators 35. Holes are provided in electrode 40 for insulators 35, and electrode 40 and insulators 43 are secured to flange 36 in the same manner as electrode 11 and insulators 35. An electrical feedthrough 44 is used to make an electrical connection to electrode 40.

Flange 36 is extended by a cylindrical photomultiplier shield 45 which encloses a photosensitive means in the form of a photomultiplier 46, as shown in FIG. 2. This is fitted in a suitable multi-pin socket (not shown) which is fitted to a flange similar to flange 25, adapted to close the other end of housing 30. Electrical connections to the socket are made through feedthroughs in this flange.

Photomultiplier tube 46 is selected to have maximum sensitivity in the wavelength range in which the maximum number of photons are emitted by phosphor 13. Under the conditions specified below, and using a P47 phosphor, this range is centered at about 400 nm. The Thorn-EMI photomultiplier type 9924 has maximum sensitivity in this range and is especially suitable for use in the invention. Further, photomultipliers of this type generally have lower background noise levels than similar types having maximum sensitivity at lower wavelengths, which is an important factor in the choice of the phosphor 13 and photomultiplier 46.

In view of the high potentials applied to the various electrodes in the detector system, the edges of these electrodes should be rounded as shown in FIG. 2 to minimize the possibility of sparking. The electrode surfaces should also be highly polished for the same reason.

When switches 20–22 are set to permit operation of detector 6, electrode 9 is maintained at a high negative potential ($-15$ kV) and phosphor 13 at a high positive potential ($+15$ kV). Electrode 11 is maintained at a positive potential intermediate between the potential of the exit aperture 18 (earth potential in this embodiment) and the potential applied to phosphor 13. A potential of $+7.5$ kV is used in the present embodiment.

Positive ions enter the region of detector 6 substantially along trajectory 5. Positive ions are deflected along trajectory 52 (FIG. 2) and strike conversion electrode 9, releasing secondary electrons 48 which are approximately focused on to phosphor 13 by the electrostatic field due to electrode 11. Photons 49 are released by phosphor 13, pass through the transparent support 42 and enter the photomultiplier 46.

Negative ions entering along trajectory 5 are repelled from electrode 9 and are accelerated along trajectory 47 to strike the inner surface of the transmission/conversion electrode 11, releasing secondary electrons 50. The majority of these leave roughly as shown in FIG. 2 and are accelerated out of electrode 11 to strike phosphor 13, releasing photons 49.

The construction of detector 7 (FIG. 1) is identical to that of detector 6, and it will be appreciated that detectors of the type described can be fitted at any required location in a mass spectrometer. Because the ions entering the detector on trajectories 52 and 47 are accelerated to a high velocity by virtue of the potentials applied to electrodes 9 and 11, there is no restriction on the kinetic energy of the ions to be detected, as there is in the case of many prior types of dual polarity ion detectors. Consequently the detector may be fitted after any type of analyzing stage, e.g., a conventional quadrupole, magnetic sector or electrostatic sector, without modification, although some adjustment of the potentials may be desirable to obtain optimum performance.

The electrical potentials required by electrodes 9 and 11, phosphor 13, and photomultiplier 46 are generated by conventional high-voltage power supplies well known in the art and shown schematically in FIG. 1 at 16 and 17. As an alternative to switching the input of amplifier 23, when minimum noise is important it is preferable to provide separate amplifiers for each detector and select the amplified output signals as required. Amplifier 23 is a low noise amplifier of the type conventionally used for photomultipliers and electron multipliers.

What is claimed is:

1. A mass spectrometer having a mass analyzer with an exit aperture through which a beam of ions emerges along an axis, said spectrometer comprising, at a location beyond said exit aperture,
    (a) conversion electrode means maintained at a negative potential with respect to said exit aperture and displaced from said axis;

(b) transmission/conversion electrode means maintained at a positive potential with respect to said exit aperture and disposed substantially opposite to said conversion electrode means on the other side of said axis;
(c) photoemissive means, capable of emitting photons when bombarded with electrons, maintained at a positive potential with respect to said transmission/conversion electrode means and disposed on the opposite side of said transmission/conversion electrode means to said axis; and
(d) photosensitive means disposed to receive photons emitted by said photoemissive means to produce an electrical signal indicative of their number.

2. A mass spectrometer as claimed in claim 1 wherein said conversion electrode means comprises a flat plate disposed generally parallel to said axis.

3. A mass spectrometer as claimed in claim 1 in which said transmission/conversion electrode means comprises a hollow cylinder disposed with its axis transverse to said axis.

4. A mass spectrometer as claimed in claim 3 wherein said transmission/conversion electrode means is positioned such that negative ions strike the inner surface of said hollow cylinder at an acute angle to the surface.

5. A mass spectrometer as claimed in claim 1 in which said photoemissive means comprises a phosphor coated on a transparent support and in which the face of said phosphor facing said transmission/conversion electrode means is metalized.

6. A mass spectrometer as claimed in claim 1 wherein said photoemissive means comprises an yttrium silicate phosphor.

7. A mass spectrometer as claimed in claim 1 in which said photosensitive means comprises a photomultiplier with its output substantially at ground potential.

8. A mass spectrometer as claimed in claim 1 in which the potential at which said transmission/conversion electrode means is maintained is further selected to cause secondary electrons emitted by said conversion electrode means to converge on a part of the surface of said photosensitive means.

9. A mass spectrometer as claimed in claim 1, comprising a first mass analyzer, a first ion detector for detecting ions leaving the first mass analyzer, a second mass analyzer, and a second ion detector for detecting ions leaving the second mass analyzer, said first ion detector comprising said conversion electrode means, transmission/conversion electrode means, photoemissive means and photosensitive means, and power supply means for supplying electrical potentials thereto such that said first ion detector can detect positive and negative ions or can allow these ions to pass substantially undeflected therethrough into said second mass analyzer.

10. A mass spectrometer having a mass analyzer and means for the detection of both positive and negative ions leaving said mass analyzer, said spectrometer comprising:
(a) conversion electrode means so disposed and maintained at such a potential that said positive ions strike its surface and release first secondary electrons therefrom;
(b) transmission/conversion electrode means so disposed and maintained at such a potential that said first secondary electrons are transmitted thereby and said negative ions strike its surface to release second secondary electrons therefrom;
(c) photoemissive means so disposed and maintained at such a potential that said first and said second secondary electrons strike its surface to release photons therefrom; and
(d) photosensitive means disposed to receive said photons to produce an electrical signal indicative of their number.

11. A mass spectrometer as claimed in claim 10 in which said photoemissive means comprises a phosphor coated on a transparent support and in which the face of said phosphor facing said transmission/conversion electrode means is metalized.

12. A mass spectrometer as claimed in claim 10 wherein said photoemissive means comprises an yttrium silicate phosphor.

13. A mass spectrometer as claimed in claim 10 in which said photosensitive means comprises a photomultiplier with its output substantially at ground potential.

14. A mass spectrometer as claimed in claim 10, in which the potential at which said transmission/conversion electrode means is maintained is further selected to cause secondary electrons emitted by said conversion electrode means to converge on a part of the surface of said photosensitive means.

15. A mass spectrometer as claimed in claim 10 comprising a first mass analyzer, a first ion detector for detecting ions leaving the first mass analyzer, a second mass analyzer, and a second ion detector for detecting ions leaving the second mass analyzer, said first ion detector comprising said conversion electrode means, transmission/conversion electrode means, photoemissive means and photosensitive means, and power supply means for supplying electrical potentials thereto such that said first ion detector can detect positive and negative ions or can allow these ions to pass substantially undeflected therethrough into said second mass analyzer.

* * * * *